Sept. 2, 1930.    A. LA R. PARKER    1,774,841
COMBINED TUBE AND PIPE COUPLING
Filed Sept. 12, 1929
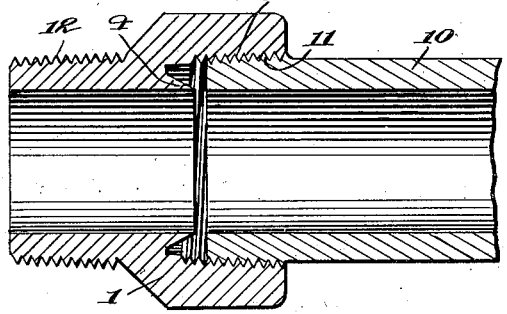
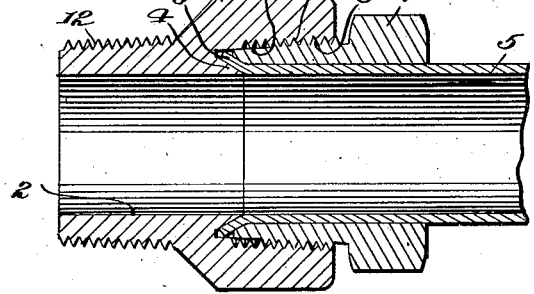
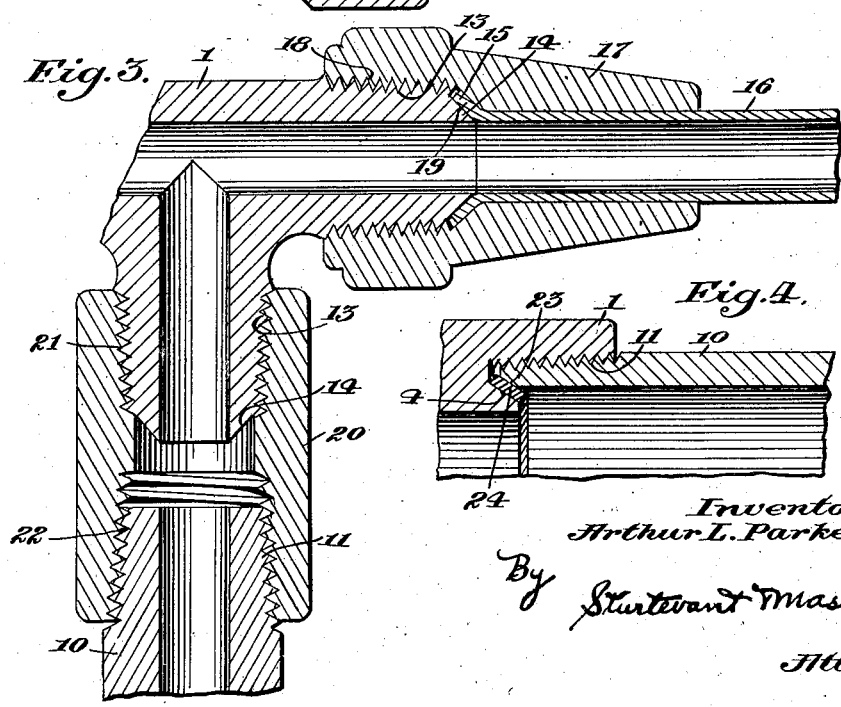
Inventor:
Arthur L. Parker,
By Sturtevant Mason
Att'ys.

Patented Sept. 2, 1930

1,774,841

UNITED STATES PATENT OFFICE

ARTHUR LA RUE PARKER, OF CLEVELAND, OHIO

COMBINED TUBE AND PIPE COUPLING

Application filed September 12, 1929. Serial No. 392,146.

The invention relates to new and useful improvements in couplings for tubes, pipes and the like.

An object of the invention is to provide a coupling which may be used for selective connection to either a pipe with standard pipe threads thereon, or to a tube having a flared end.

A further object of the invention is to provide a coupling of the above type wherein a pipe thread on the coupling may be used in connection with a pipe thread on a coupling nut for joining the flared end of a tube to the coupling.
In the drawings:—

Figure 1 is a sectional view through one form of coupling embodying the improvements, and showing a tube with a flared end attached thereto.
Fig. 2 is a similar view showing a pipe with a threaded end attached to the coupling.

Fig. 3 is a view showing in section a coupling having a plurality of connections with pipe threads on the exterior of said connections, a flared tube being shown as attached to one of said connections and a threaded pipe as attached to another of the connections.

Fig. 4 is a detail showing a slightly modified arrangement of threaded pipe connection.

The invention is directed to a coupling to which a pipe may be attached or to which a flared tube may be attached. In other words, the coupling is interchangeable and may be used for making selectively connections with either pipes or tubes. To this end the coupling is provided with a standard pipe thread which may be formed interiorly of the coupling or exteriorly thereof. When formed interiorly a pipe having a pipe thread on the exterior thereof may be joined directly to said coupling. The coupling is also provided with a seat for the flared end of a tube and a coupling nut having a pipe thread thereon is used for joining the tube to the coupling. When the coupling is provided with a pipe thread on the exterior thereof the tube is joined directly to the coupling by means of a coupling nut which clamps the flared end of the tube against the seat on the coupling. In order to attach a pipe with an exterior thread to this form of coupling a standard form of coupling sleeve having the interior thereof provided with pipe threads is used for joining the pipe to the coupling.

Referring more in detail to the drawings, one form of coupling is shown in Fig. 1 which consists of a body portion 1 having an opening 2 therethrough. Said body portion is provided with a tapered recess in the wall of which is formed a pipe thread indicated at 3. The body portion is also provided with a tapered seat 4 at the inner end of this recess. The opening 2 through the coupling is of substantially uniform diameter to the end of the seat 4. The seat 4 is so dimensioned as to be yielding to a certain extent so as to conform to the flared end of the tube. This yielding seat is of the construction shown in my prior Patent No. 1,619,755, granted March 1, 1927.

As shown in Fig. 1 of the drawings, a tube is secured to the coupling. The tube is indicated at 5. The tube is provided with the usual flared end 6 which conforms substantially to the taper of the seat 4. A coupling nut 7 is provided with pipe threads 8 on the outer face thereof and, as shown in the drawings, these threads terminate so as to provide a smooth portion 9 beyond the pipe threads and in the region directly opposed to the end of the pipe which is clamped against the seat 4 by the coupling nut 7. It will obvious that the threads 8 on the outer surface may be extended all the way to the end of the nut and the inner end of the recess without departing from the spirit of the invention as set forth in the appended claims. This coupling nut 7 is provided at the inner end thereof with a tapered seat 25. The tapered seats 4 and 25 are initially substantially parallel, and when the coupling nut is threaded into the coupling member 1 the flared end of the tube will be clamped between the tapered seats on the coupling nut and the coupling member and the intimate contact with the flared end of the tube referred to above will be obtained.

The thread 3 may be of any well known standard, such as, for example, the Briggs, Whitworth, or metric. The threaded wall is of the usual standard dimensions as well as the threads. It is well known that when two parts provided with pipe threads are joined—the extent to which one may be screwed into the other is substantially determined by the relative diameters of the threaded parts. The coupling nut is so dimensioned that the forward end thereof makes contact with the flared end on the tube and clamps said flared end forcibly against the seat on the coupling body before the pipe threads on the coupling nut and coupling are engaged to their full limit. It will be customary in couplings of this character to so proportion the sizes of the relative threads that the tube coupling nut (for attaching tube) may be screwed freely into or onto the tube coupling body so that the coordinating surfaces of the seating portions of the two parts will seat tightly together, even though no tube is interposed between these seating surfaces. This relative thread size is determined preferably by deviation from established standards on the tube coupling nut piece only and not by deviation from established standard fit for any threaded portion of the fitting body, thus assuring the standard fit for any threaded pipe or pipe fitting which may be screwed into or onto the body of the coupling.

In Figs. 2 and 4 of the drawings the coupling is shown as having a pipe attached thereto in place of the attachment of the tube. This is attached by screwing the end of the pipe having a standard pipe thread thereon into the coupling which likewise has a standard pipe thread on the interior thereof. As shown in Fig. 2 the end of the pipe does not make contact with the seat for the flared end of the tube. As shown in Fig. 4 however the end of the pipe is chamfered as indicated at 23, and engages a gasket 24 engaging the seat on the coupling member.

The coupling, as shown in Figs. 1 and 2, is provided with a thread 12 which may be of any standard type. It is understood that this coupling may be greatly modified as to the arrangement of the parts; it may have more than one extension to which the tube or pipe is connected.

In Fig. 3 of the drawings the coupling is shown as having a plurality of extensions to which tubes or pipes may be connected and each extension is formed with a pipe thread 13 on the outer face of the coupling. Each extension also has a seat 14 against which the flared end 15 of a tube 16 is clamped by a coupling nut 17. The coupling nut 17 is provided with a pipe thread 18 on the interior thereof. In order that the shoulder 19 on the coupling may be brought into intimate contact with the flared end of the tube and clamp said tube firmly against the seat 14, the pipe thread 18 on the coupling nut is made over size and this gives a sufficient movement of the coupling nut onto the coupling body to bring about the firm gripping or clamping of the flared end of the tube.

In order to secure a pipe to this externally threaded extension of the coupling an ordinary standard coupling sleeve 20 is used. This coupling sleeve has a pipe thread 21 on the interior at one end thereof and a pipe thread 22 on the interior of the other end thereof. The pipe to be attached is illustrated at 10. This sleeve coupling 20 is screwed onto the pipe and the sleeve coupling is also screwed onto the extension of the coupling body. Thus it is that the pipe is joined to the extension and the pipe threads are used for this purpose. From the above it will be apparent that I have provided a means for selective connection to a pipe end having standard pipe threads thereon to a flared tube end. The tube end is clamped between the tapered seats on the coupling member 1 and the coupling nut 7. The threads on the coupling member and the coupling nut and the tapered seats are so proportioned and related that the flared end of the tube may be firmly clamped between the tapered seats by the cooperative action of the pipe threads.

It will be understood, of course, that the details of construction of the coupling body and the coupling nut may be greatly varied, the essential feature consisting in the utilizing of the pipe thread as a means for joining the coupling nut to the coupling body and at the same time insuring that the coupling nut will clamp the flared end of the tube secured thereby firmly against the seat on the coupling body. Thus it is that the coupling body may be interchangeably used for attachment to a tube with a flared end or for attachment to a pipe with a threaded end.

Having thus fully described my invention, what I claim as new and desire to secure by Letters Patent, is:—

1. A means for selective connection to a pipe end having standard threads or flared tube end comprising a coupling member having standard pipe threads thereon and a tapered seat, a tube clamping member having pipe threads thereon adapted to cooperate with the pipe threads on the coupling member and a tapered seat, said pipe threads and tapered seats being so proportioned and related that the flared end of the tube may be clamped between the tapered seats by the cooperative action of said pipe threads.

2. A means for selective connection to a pipe end having standard pipe threads or a flared tube end comprising a coupling member having a recess therein provided with standard pipe threads and a tapered seat at the inner end of said recess, a tube clamping nut having pipe threads thereon adapted to cooperate with the pipe threads on said coupling member and a tapered seat at the inner end thereof, said tapered seats being initially substantially parallel, said pipe threads and said tapered seats being so proportioned and related that the flared end of the tube may be clamped between the tapered seats by the cooperative action of said pipe threads.

In testimony whereof, I affix my signature.

ARTHUR LA RUE PARKER.